US012567792B2

(12) United States Patent
Chang et al.

(10) Patent No.: US 12,567,792 B2
(45) Date of Patent: Mar. 3, 2026

(54) SWITCHING REGULATOR AND CONTROL METHOD THEREOF

(71) Applicant: Richtek Technology Corporation, Zhubei City (TW)

(72) Inventors: Chia-Jung Chang, Hsinchu (TW); Yu-Pin Tseng, Miaoli (TW)

(73) Assignee: Richtek Technology Corporation, Zhubei City (TW)

( * ) Notice: Subject to any disclaimer, the term of this patent is extended or adjusted under 35 U.S.C. 154(b) by 201 days.

(21) Appl. No.: 18/649,881

(22) Filed: Apr. 29, 2024

(65) Prior Publication Data

US 2025/0192673 A1     Jun. 12, 2025

(30) Foreign Application Priority Data

Dec. 11, 2023     (TW) ................................. 112148116

(51) Int. Cl.
| | |
|---|---|
| *H02M 3/158* | (2006.01) |
| *H02M 1/00* | (2006.01) |
| *H02M 1/36* | (2007.01) |
| *H02M 3/00* | (2006.01) |

(52) U.S. Cl.
CPC ....... *H02M 1/0032* (2021.05); *H02M 1/0058* (2021.05); *H02M 1/36* (2013.01); *H02M 3/01* (2021.05); *H02M 3/158* (2013.01)

(58) Field of Classification Search
CPC ...... H02M 1/0032; H02M 1/36; H02M 3/158; H02M 1/0058; H02M 3/156; H02M 3/01; H02M 1/4225
See application file for complete search history.

(56) References Cited

U.S. PATENT DOCUMENTS

| | | | |
|---|---|---|---|
| 8,629,660 B2 | 1/2014 | Nalbant | |
| 2010/0225290 A1* | 9/2010 | Nalbant | H02M 3/156 |
| | | | 323/282 |
| 2014/0225439 A1 | 8/2014 | Mao | |
| 2017/0324345 A1 | 11/2017 | Stuler | |
| 2019/0140635 A1* | 5/2019 | Abesingha | H03K 17/0822 |
| 2023/0318472 A1* | 10/2023 | Cabizza | H02M 1/083 |
| | | | 307/10.1 |

* cited by examiner

*Primary Examiner* — Alex Torres-Rivera
(74) *Attorney, Agent, or Firm* — Tung & Associates

(57) ABSTRACT

A switching regulator includes: a power stage circuit configured to operably control a power switch therein according to a pulse width modulation signal to switch an inductor coupled to a phase node, so as to convert an input voltage to an output voltage; and a control circuit configured to operably determine an equivalent capacitance adjustment procedure to enter or sustain an enabled state according to a phase node voltage at the phase node at an inductor magnetization start time point in a discontinuous conduction mode (DCM) to adjust an equivalent capacitance at the phase node, so as to reduce a voltage across the power switch at another inductor magnetization start time point after the equivalent capacitance adjustment procedure.

27 Claims, 9 Drawing Sheets

203

2023
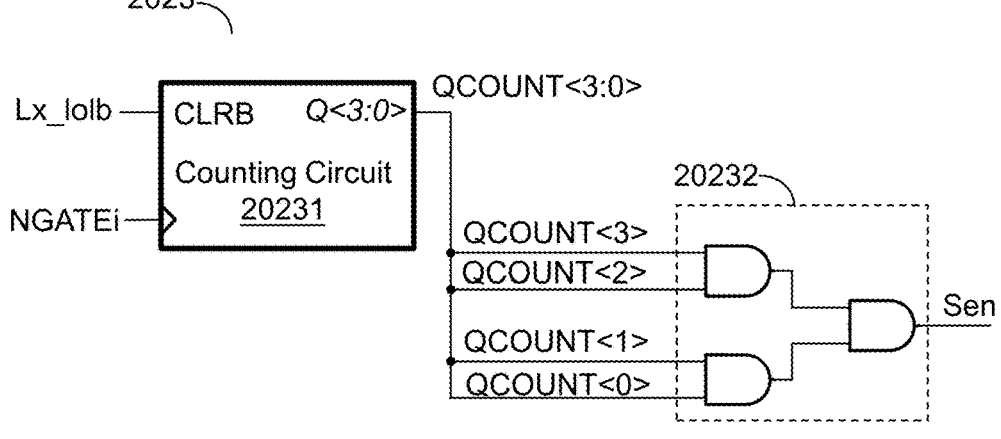
Fig. 2E
2024
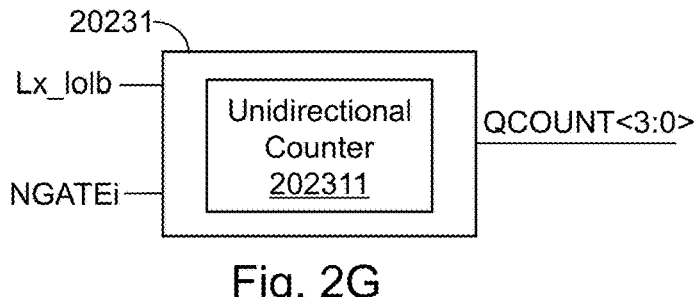
Fig. 2F
20231
Lx_lolb —
Unidirectional
Counter
202311
NGATEi —
— QCOUNT<3:0>
Fig. 2G
20241
VCC/POR —
Unidirectional
Counter
202411
Sen —
— QGATE<3:0>
Fig. 2H

| Load Current | Prior Art | | Present Invention | |
|---|---|---|---|---|
| | Light Load Efficiency | Vlx | Light Load Efficiency | Vlx |
| 4.0 mA | 90.4 % | | 88.2 % | |
| 6.0 mA | 84.9 % | 15.4 V | 86.6 % | 4.5 V |
| 8.0 mA | 83.4 % | 18.5 V | 90.2 % | 7.9 V |
| 10.0 mA | 84.0 % | 18.6 V | 92.3 % | 5.6 V |
| 20.0 mA | 93.6 % | 10.9 V | 95.7 % | 3.6 V |
| 40.0 mA | 93.4 % | 18.1 V | 95.0 % | 7.9 V |
| 60.0 mA | 95.7 % | 13.9 V | 95.1 % | 12.8 V |
| 80.0 mA | 94.6 % | 18.1 V | 95.0 % | 5.7 V |
| 100.0 mA | 96.1 % | 5.0 V | 96.0 % | 7.6 V |

SWITCHING REGULATOR AND CONTROL METHOD THEREOF

CROSS REFERENCE

The present invention claims priority to TW patent application Ser. No. 112148116, filed on Dec. 11, 2023.

BACKGROUND OF THE INVENTION

Field of Invention

The present invention relates to a switching regulator and its control method, specifically referring to a switching regulator and its control method that can operate at a fixed frequency while achieving better light-load efficiency.

Description of Related Art

FIG. 1 is a schematic diagram showing the light-load efficiency of prior art switching regulators relative to the phase node voltage at the time the low-side switch is turned on. As shown in FIG. 1, this prior art switching regulator, because it uses a single fixed switching frequency and lacks zero voltage switching (ZVS) functionality, exhibits lower switching losses when the phase node voltage is lower (i.e., when the low-side switch is turned on near the valley of the resonant signal), resulting in relatively higher light-load efficiency. Conversely, when the phase node voltage is higher (i.e., when the low-side switch is turned on near the peak of the resonant signal), it incurs higher switching losses and thus lower light-load efficiency, leading to unstable light-load efficiency. The light-load efficiency is higher only when it is close to the valley of the phase node voltage.

Another prior art technique involves utilizing the zero voltage switching feature to adjust the timing of the low-side switch's turn-on so that it always occurs when the phase node voltage is at zero, achieving zero voltage switching and thereby enhancing the power conversion efficiency. However, this can exceed the operating frequency range allowed by circuits of load devices that require a fixed switching frequency (operating frequency). For instance, when load device circuits, such as those used in light-emitting diode drivers for stylus touch screens, need to operate within a specific frequency range, the zero voltage switching method is not suitable. Related prior art is shown in U.S. Pat. No. 8,629,660B2.

In view of this, the present invention addresses the shortcomings of the aforementioned prior art by proposing a switching regulator and its control method that can operate at a fixed frequency and is still able to achieve better light-load efficiency.

SUMMARY OF THE INVENTION

From one perspective, the present invention provides a switching regulator, including: a power stage circuit configured to control a power switch based on a pulse width modulation signal, switching an inductor coupled at a phase node to convert an input voltage into an output voltage; and a control circuit configured, in a discontinuous conduction mode (DCM), to determine an equivalent capacitance adjustment procedure to enter or sustain an enable state based on the voltage at the phase node at the start of inductor magnetization, thereby adjusting the equivalent capacitance at the phase node to reduce the voltage across the power switch at the start of the next inductor magnetization.

In one embodiment, the control circuit determines the equivalent capacitance adjustment procedure to enter or sustain the enable state when the voltage at the phase node exceeds a predetermined threshold voltage at the start of inductor magnetization.

In one embodiment, the control circuit adjusts the equivalent capacitance after the equivalent capacitance adjustment procedure has been enabled and sustained for a predetermined duration.

In one embodiment, the control circuit, while the capacitance adjustment procedure is in the enable state, counts the pulses of the pulse width modulation signal to accumulate a pulse count and indicates that the capacitance adjustment procedure has been sustained for the predetermined duration once the pulse count exceeds a predetermined number of pulses.

In one embodiment, the control circuit includes: a comparator circuit, configured to compare the voltage at the phase node with the predetermined threshold voltage to generate a comparison signal; a determination circuit configured to generate an enable and hold signal, based on the comparison signal and the pulse width modulation signal, when the voltage at the phase node is determined exceeding the predetermined threshold voltage at the start of inductor magnetization; a capacitance adjustment procedure circuit, configured to generate a procedure signal based on the enable and hold signal and the pulse width modulation signal; and an equivalent capacitance adjustment circuit configured to generate an equivalent capacitance adjustment signal, based on the procedure signal, to adjust the equivalent capacitance on the phase node.

In one embodiment, the switching regulator further includes a resonant regulator coupled to the phase node and including a capacitor array with plural capacitors, wherein the resonant regulator determines a combination of the plural capacitors to be electrically connected to the phase node based on the equivalent capacitance adjustment signal, so as to adjust the equivalent capacitance on the phase node.

In one embodiment, the plural capacitors in the capacitor array have a maximum total capacitance value and/or a capacitance resolution that is relate to the predetermined threshold voltage.

In one embodiment, the capacitance adjustment procedure circuit includes a first counting circuit configured to count the pulses of the pulse width modulation signal based on the enable and hold signal to generate the procedure signal which represents the pulse count.

In one embodiment, the capacitance adjustment procedure circuit further includes a logic circuit configured to generate an enable adjustment signal when the pulse count represented by the procedure signal exceeds the predetermined number of pulses indicated by the procedure signal, thereby enabling the equivalent capacitance adjustment circuit to generate the equivalent capacitance adjustment signal.

In one embodiment, the equivalent capacitance adjustment circuit includes a second counter, which cumulatively counts and adjusts the equivalent capacitance adjustment signal by a predetermined unit when the adjustment enable signal is switched to an enable state, so as to adjust the combination of the plural capacitors to be electrically connected to the phase node.

In one embodiment, the first counting circuit includes a first unidirectional counter configured to count the pulses of the pulse width modulation signal based on the enable and hold signal in a unidirectional manner, wherein the logic circuit generates the enable adjustment signal when the pulse count indicated by the procedure signal exceeds the predetermined number of pulses.

In one embodiment, when the pulse count indicated by the procedure signal exceeds the predetermined number of pulses, the first unidirectional counter overflows and resets to count cyclically.

In one embodiment, the second counter includes a second unidirectional counter that, when the adjustment enable signal is in an enable state, cumulatively counts the equivalent capacitance adjustment signal in a unidirectional manner to correspondingly adjust the combination of the plural capacitors to be electrically connected to the phase node.

In one embodiment, when the second unidirectional counter cumulatively counts to a predetermined counting limit in a unidirectional manner, the second unidirectional counter overflows and resets to count cyclically.

In one embodiment, the predetermined duration is related to a control loop bandwidth of the switching regulator and/or a stability level of the equivalent capacitance adjustment procedure.

In one embodiment, the control circuit adjusts the equivalent capacitance at the phase node so that at the start of inductor magnetization in a steady state, the phase node voltage does not exceed the predetermined threshold voltage.

From another perspective, the present invention provides a control method for controlling a switching regulator which includes a power stage circuit that controls a power switch based on a pulse width modulation signal and switches an inductor coupled to a phase node to convert an input voltage to an output voltage, the control method including: determining an equivalent capacitance adjustment procedure to enter or sustain an enable state based on the voltage at the phase node at the start of inductor magnetization in a discontinuous conduction mode (DCM); and adjusting the equivalent capacitance at the phase node according to the equivalent capacitance adjustment procedure to reduce the voltage across the power switch at the start of the next inductor magnetization.

In one embodiment, the step of determining the equivalent capacitance adjustment procedure to enter or sustain the enable state in a discontinuous conduction mode (DCM) based on the phase node voltage at the start of inductor magnetization includes: deciding the equivalent capacitance adjustment procedure to enter or sustain the enable state when the phase node voltage exceeds a predetermined threshold voltage at the start of inductor magnetization.

In one embodiment, the step of adjusting the equivalent capacitance at the phase node to reduce the voltage across the power switch at the start of the next inductor magnetization includes: adjusting the equivalent capacitance after the equivalent capacitance adjustment procedure entering or sustaining the enable state and sustaining for a predetermined duration.

In one embodiment, during the equivalent capacitance adjustment procedure in the enable state, counting the pulses of the pulse width modulation signal for accumulating a pulse count; and indicating that the equivalent capacitance adjustment procedure has been sustained for the predetermined duration once the pulse count exceeds a predetermined number of pulses.

In one embodiment, the step of indicating that the equivalent capacitance adjustment procedure has been sustained for the predetermined duration includes: counting the pulses of the pulse width modulation signal in a unidirectional manner; and overflowing and resetting to count cyclically when the pulse count exceeds a predetermined number of pulses.

In one embodiment, the step of determining an equivalent capacitance adjustment procedure in an enable state during a discontinuous conduction mode (DCM) based on the voltage at the phase node at the start of inductor magnetization includes: comparing the voltage at the phase node with the predetermined threshold voltage to generate a comparison signal; generating an enable and hold signal based on the comparison signal and the pulse width modulation signal when the voltage at the phase node exceeds the predetermined threshold voltage at the start of inductor magnetization; conducting the equivalent capacitance adjustment procedure based on the enable and hold signal and the pulse width modulation signal to generate a procedure signal; and generating an equivalent capacitance adjustment signal based on the procedure signal.

In one embodiment, the control method further comprises: during the equivalent capacitance adjustment procedure, determining the combination of the plural capacitors to be electrically connected to the phase node based on the equivalent capacitance adjustment signal, thereby adjusting the equivalent capacitance at the phase node.

In one embodiment, the maximum total capacitance value and/or capacitance resolution of the plural capacitors are related to the predetermined threshold voltage.

In one embodiment, the predetermined duration is related to a control loop bandwidth of the switching regulator and/or a stability level of the equivalent capacitance adjustment procedure.

In one embodiment, the step of reducing the voltage across the power switch at the start of the next inductor magnetization includes: adjusting the equivalent capacitance at the phase node so that at the start of inductor magnetization in a steady state, the phase node voltage does not exceed the predetermined threshold voltage.

In one embodiment, the step of generating the equivalent capacitance adjustment signal based on the procedure signal includes: cumulatively counting the equivalent capacitance adjustment signal in a unidirectional manner to correspondingly adjust the combination of the plural capacitors to be electrically connected to the phase node; and overflowing and resetting to count cyclically when a count represented by the equivalent capacitance adjustment signal reaches a predetermined counting limit.

The advantages of the present invention are that the present invention can operate with a fixed frequency while achieving better light-load efficiency.

The objectives, technical details, features, and effects of the present invention will be better understood with regard to the detailed description of the embodiments below, with reference to the attached drawings.

BRIEF DESCRIPTION OF THE DRAWINGS

FIG. 1 is a schematic diagram showing the light-load efficiency of prior art switching regulators in relation to the phase node voltage at the time the low-side switch is turned on.

FIG. 2E is a schematic diagram of the capacitance adjustment procedure circuit within the control circuit of a switching regulator according to an embodiment of the invention.

FIG. 2F is a schematic diagram of the equivalent capacitance adjustment circuit within the control circuit of a switching regulator according to an embodiment of the invention.

FIG. 2G is a block diagram of the counting circuit in the capacitance adjustment procedure circuit within the control circuit of a switching regulator according to an embodiment of the invention.

FIG. 2H is a block diagram of the counter in the equivalent capacitance adjustment circuit within the control circuit of a switching regulator according to an embodiment of the invention.

FIG. 6 is a graph according to an embodiment of the invention showing the relationship between the light-load efficiency of the switching regulator according to the invention and the phase node voltage at the time the low-side switch is turned on, compared to the relationship between the light-load efficiency related and the phase node voltage of prior art switching regulators at the time the low-side switch is turned on.

FIG. 7 is a list according to an embodiment of the invention showing the light-load efficiency of switching regulator according to the invention versus the phase node voltage at the time the low-side switch is turned on under different load currents, compared to the light-load efficiency versus the phase node voltage of prior art switching regulators at the time the low-side switch is turned on.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
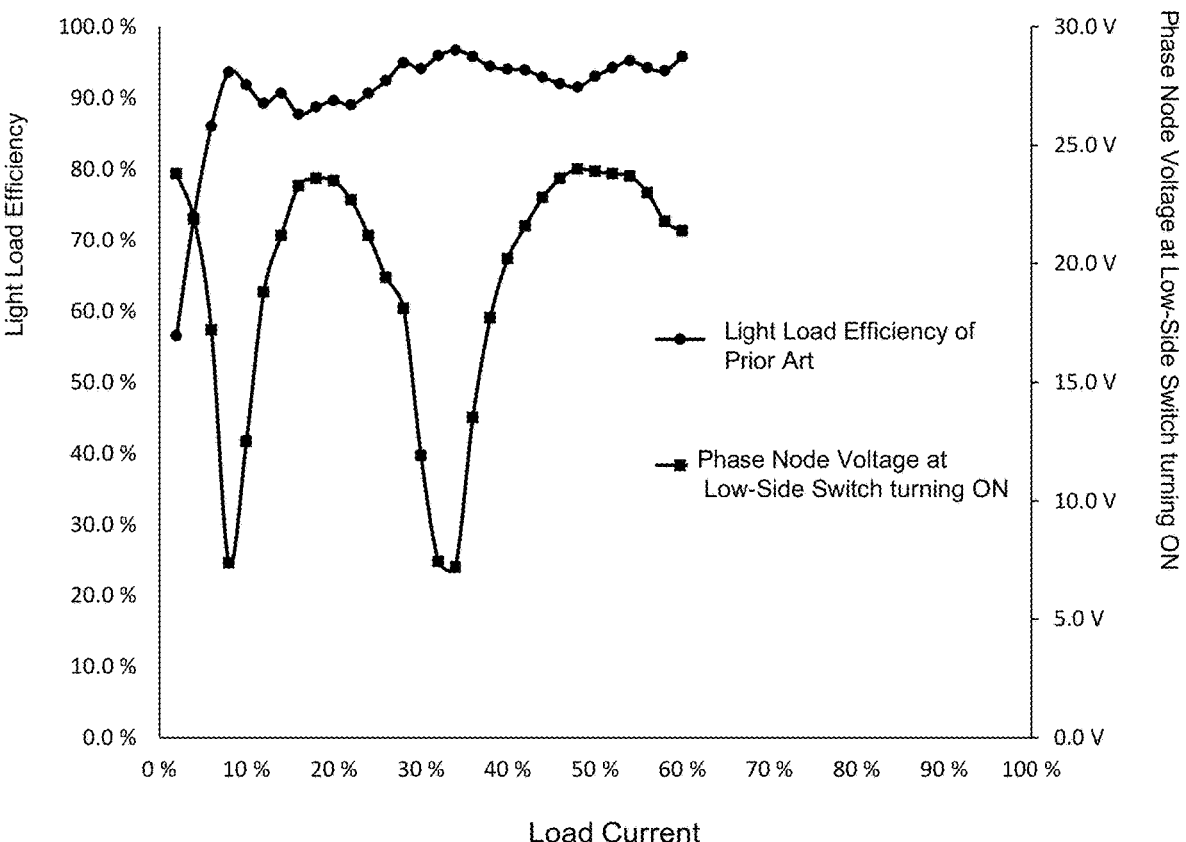
Figure 2A:
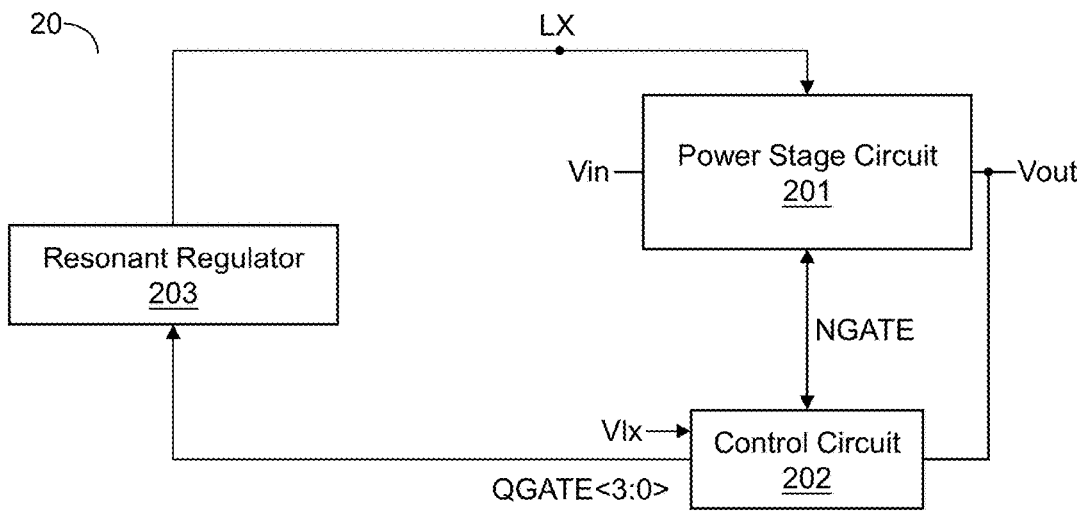
FIG. 2A is a block diagram of a switching regulator according to an embodiment of the invention.
Figure 2B:
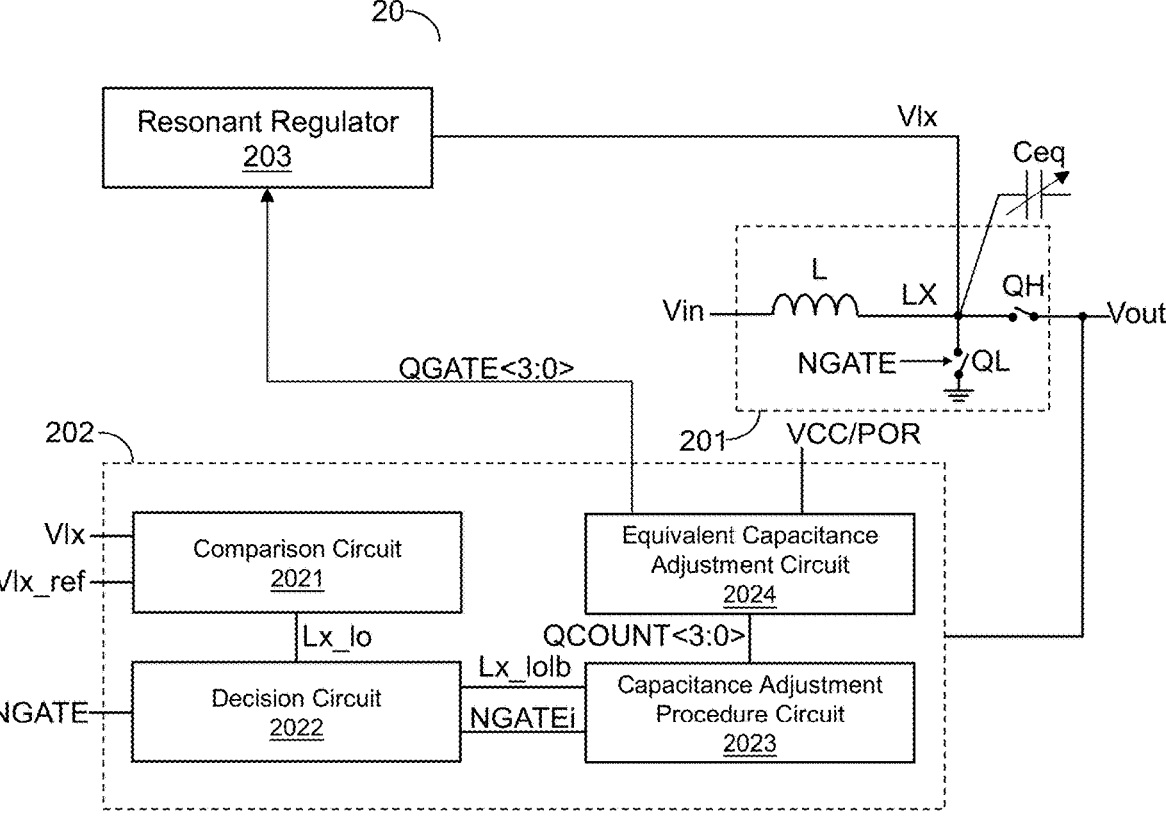
FIG. 2B is another block diagram of a switching regulator according to an embodiment of the invention.

FIG. 2A is a block diagram of a switching regulator according to an embodiment of the invention. FIG. 2B is another block diagram of a switching regulator according to an embodiment of the invention. As shown in FIG. 2A, the switching regulator 20 of the present invention includes a power stage circuit 201 and a control circuit 202. Referring to FIGS. 2A and 2B simultaneously, the power stage circuit 201 controls power switches QL and QH based on the pulse width modulation signal NGATE, switching the inductor L coupled at the phase node LX to convert the input voltage Vin into the output voltage Vout. The control circuit 202, in discontinuous conduction mode (DCM), determines the equivalent capacitance adjustment procedure to enter or sustain an enable state based on the phase node voltage Vlx at the phase node LX at the start of inductor magnetization, and subsequently adjusts the equivalent capacitance Ceq at the phase node LX to reduce the voltage across the power switch QL at the next start of inductor magnetization. The power stage circuit 201 can be, for example but not limited to, a boost-type power stage as shown in FIG. 2B.

Figure 5:
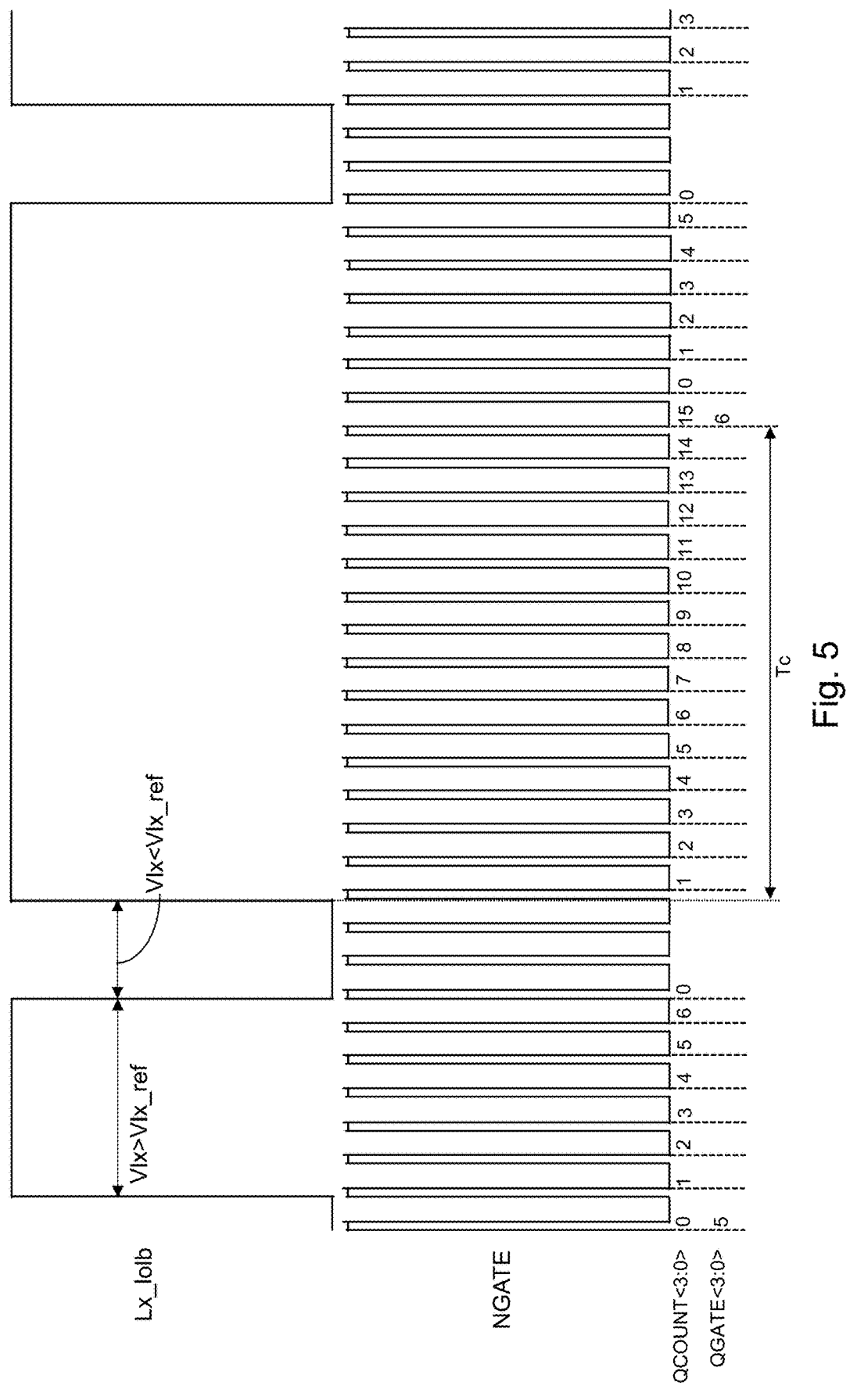

Simultaneously referring to FIGS. 2A and 5, in this embodiment, the control circuit 202 adjusts the equivalent capacitance Ceq after the equivalent capacitance adjustment procedure turns to the enable state and sustains for a predetermined duration Tc. During the enable state of the equivalent capacitance adjustment procedure, the control circuit 202 counts the pulses of the pulse width modulation signal NGATE to accumulate a pulse count. While the equivalent capacitance adjustment procedure remains in the enable state, when the pulse count exceeds a predetermined number of pulses, it indicates that the equivalent capacitance adjustment procedure has been sustained in the enable state for the predetermined duration Tc. As shown in FIG. 2A, the switching regulator 20 further includes a resonant regulator 203. The resonant regulator 203 is coupled to the phase node LX. In another embodiment, the control circuit 202 can alternatively adjust the equivalent capacitance Ceq immediately after the equivalent capacitance adjustment procedure turns to the enable state, thereby reducing the phase node voltage Vlx when the power switches QL and QH finishing their off states, in DCM, at the next start of inductor magnetization. In yet other embodiments, the control circuit 202 can alternative time how long the equivalent capacitance adjustment procedure is sustained in the enable state in other ways to determine the adjustment of the equivalent capacitance Ceq. In a preferred embodiment, the control circuit 202 continuously adjusts the equivalent capacitance Ceq based on the predetermined duration the equivalent capacitance adjustment procedure is sustained in the enable state, ensuring the phase node voltage Vlx reaches zero at the next start of inductor magnetization after the equivalent capacitance adjustment procedure, allowing the power switches QL and/or QH in the power stage circuit 201 to achieve zero-voltage switching, thereby reducing the switching losses.

It should be noted that when the pulse width modulation signal NGATE of the switching regulator 20 has a single fixed frequency, and when the switching regulator 20 operates in DCM with the power switches QL and QH in the off state, the phase node voltage Vlx on the phase node LX is a quasi-resonant signal. Taking a boost-type power stage circuit 201 as an example, in DCM when the power switches QL and QH are off at the next start of inductor magnetization, the power switch QL switches to conduction, and its switching loss Ploss formula is as follows:

$$Ploss = \frac{1}{2} fsw\, Ceq\, Vlx^2$$

Herein, fsw is the single fixed frequency of the pulse width modulation signal NGATE. From the above formula, it is known that the switching loss Ploss of the power switch QL is directly proportional to the square of the phase node voltage Vlx on the phase node LX. If the phase node voltage Vlx can be can be relatively lower at the next start of inductor magnetization after the power switches QH and QL finish their off state (i.e., at the turning-on time point of power switch QL), it can reduce the switching loss Ploss and improve the light-load efficiency of the switching regulator 20 when operating in DCM, operating in light-load, as previously mentioned. As mentioned earlier, when the power switches QL and QH are in the off state, the equivalent capacitance Ceq and the inductor L form a resonant circuit and cause quaisi-resonance, making the phase node voltage Vlx a quasi-resonant signal, of which frequency is related to the equivalent capacitance Ceq and inductor L. Therefore, according to the invention, adjusting the equivalent capacitance Ceq aims to adjust the frequency of this resonant signal, so that the next starting time point of inductor magnetization (also the turning-on time point of power switch QL) will be as close as possible to the valley of the quasi-resonant signal, thereby reducing the switching loss Ploss of the power switch QL.

In one embodiment, the predetermined duration Tc relates to the control loop bandwidth of the switching regulator 20 and/or the stability of the equivalent capacitance adjustment procedure. As shown in FIG. 2B, control circuit 202 adjusts the equivalent capacitance Ceq at the phase node LX to ensure that the voltage Vlx at the phase node does not exceed the predetermined threshold voltage Vlx_ref at the start of inductor magnetization in steady state.

Referring to FIG. 2B, at the start of inductor magnetization, when the phase node voltage Vlx exceeds the predetermined threshold voltage Vlx_ref, the control circuit 202 enables the equivalent capacitance adjustment procedure, and according to the enable state of the adjustment procedure, adjusts the equivalent capacitance Ceq at the phase node LX. The control circuit 202 includes a comparison circuit 2021, a decision circuit 2022, a capacitance adjustment procedure circuit 2023, and an equivalent capacitance adjustment circuit 2024. The comparison circuit 2021 compares the phase node voltage Vlx with the predetermined threshold voltage Vlx_ref and generates a comparison signal Lx_lo. The decision circuit 2022, based on the pulse width modulation signal NGATE, at each start of inductor magnetization, uses the comparison signal Lx_lo to determine whether the phase node voltage Vlx exceeds the predetermined threshold voltage Vlx_ref, and generates an enable and hold signal Lx_lolb when the phase node voltage Vlx exceeds the predetermined threshold voltage Vlx_ref.

The capacitance adjustment procedure circuit 2023, based on the enable and hold signal Lx_lolb and the pulse width modulation signal NGATEi, conducts the equivalent capacitance adjustment procedure to generate a procedure signal QCOUNT<3:0>. The equivalent capacitance adjustment circuit 2024 generates an equivalent capacitance adjustment signal QGATE<3:0> based on the procedure signal QCOUNT<3:0>.

Figure 2C:
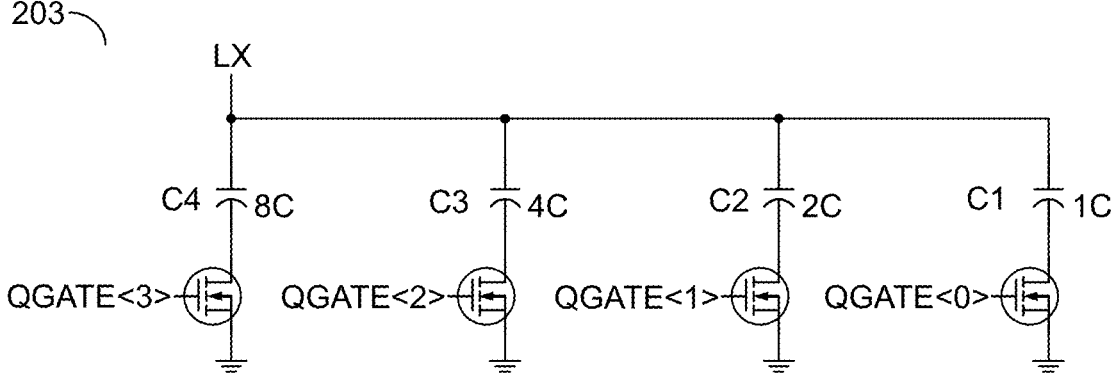
FIG. 2C is a schematic diagram of a resonant regulator in a switching regulator according to an embodiment of the invention.

FIG. 2C shows a schematic diagram of a resonant regulator of the switching regulator according to an embodiment of the invention. As shown in FIG. 2C, the resonant regulator 203 includes a capacitor array which includes capacitors C1, C2, C3, and C4, with capacitance values of 1C, 2C, 4C, and 8C respectively. During the equivalent capacitance adjustment procedure, based on the equivalent capacitance adjustment signal QGATE<3:0>, the resonant regulator 203 selectively couples a combination of these capacitors to be electrically connected to the phase node LX to configure the combination of the equivalent capacitance Ceq on the phase node LX. In this embodiment, the combination of capacitors C1-C4 to be electrically connected to the phase node LX is decided based on the signal QGATE<3:0>, thus setting the capacitance values between 0 and 15C. In one embodiment, the total maximum capacitance value of the capacitors in the capacitor array C1, C2, C3, C4 (15C in this instance) and/or the capacitance resolution (1C in this instance) is related to the predetermined threshold voltage Vlx_ref.

Figure 2D:
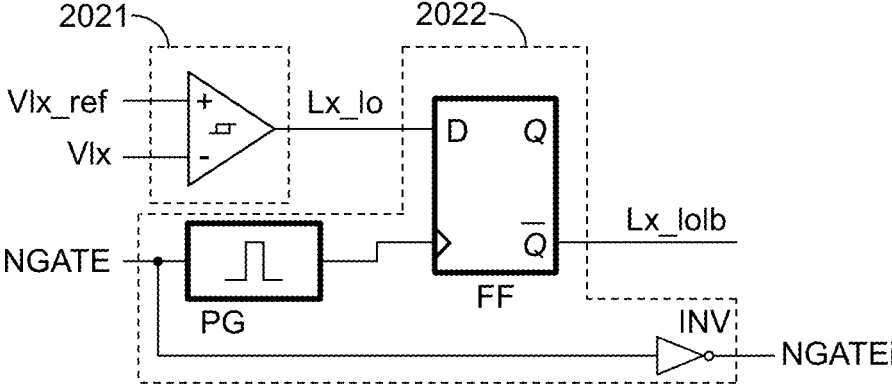
FIG. 2D is a schematic diagram of the comparison circuit and the decision circuit within the control circuit of a switching regulator according to an embodiment of the invention.
Figures 3A, 3B, 3C:
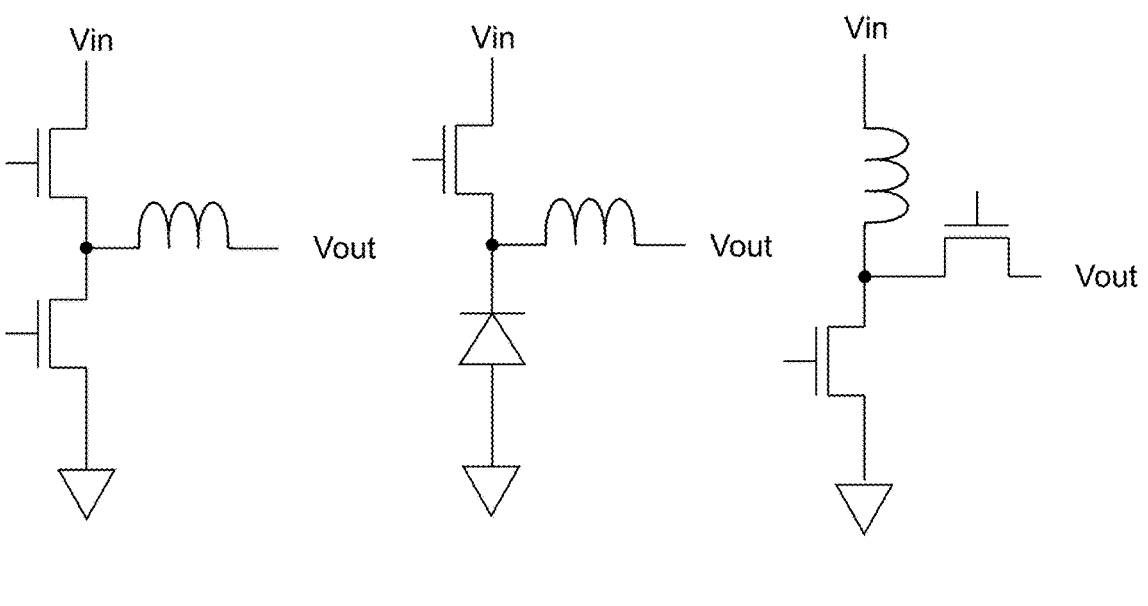
FIGS. 3A to 3K show various embodiments of the switching regulator to which the invention can be applied.
Figures 3D, 3E, 3F:
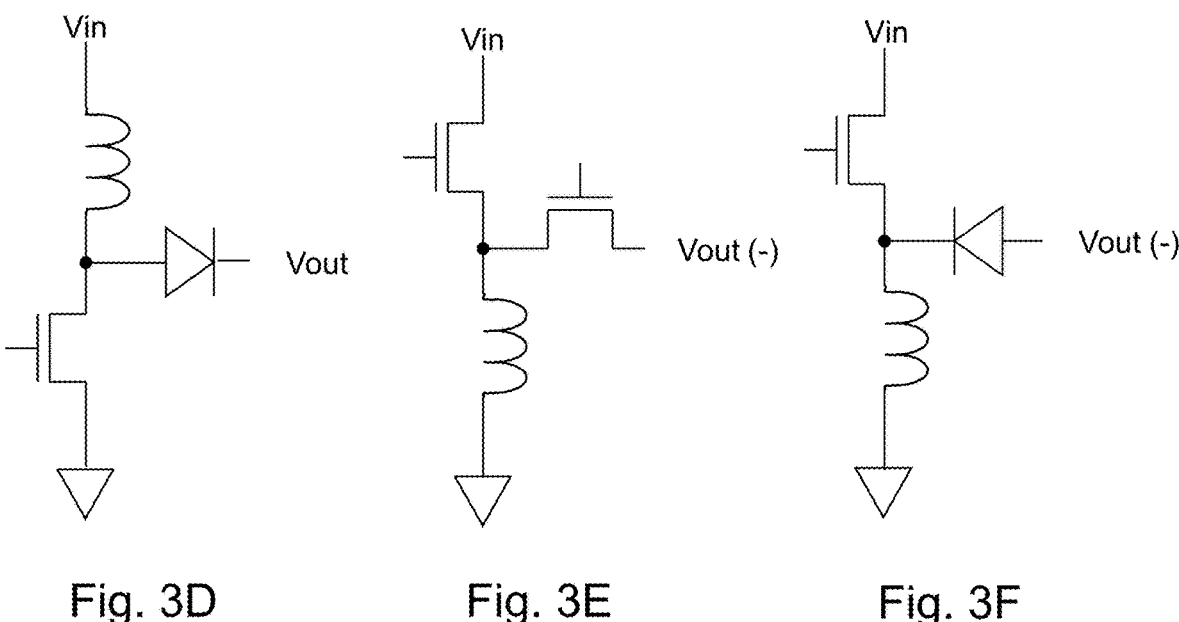
Figure 3G:
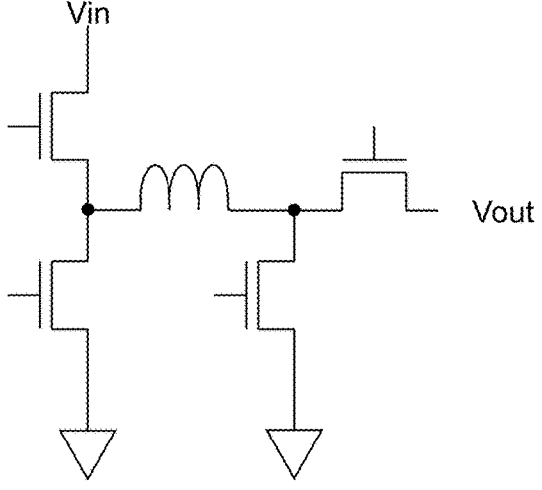
Figure 3H:
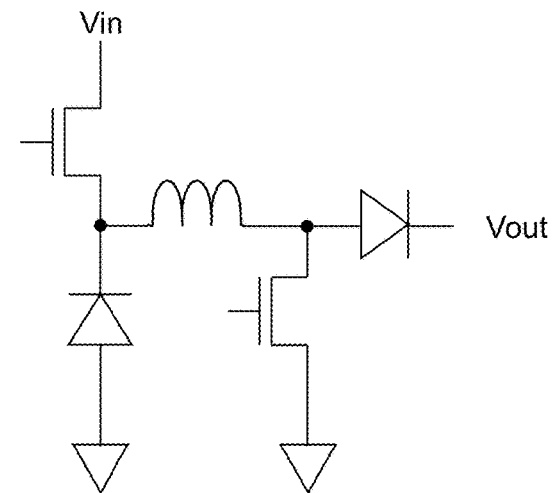
Figure 3I:
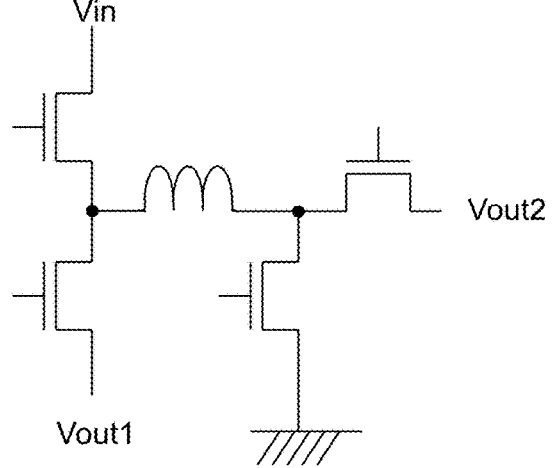
Figure 3J:
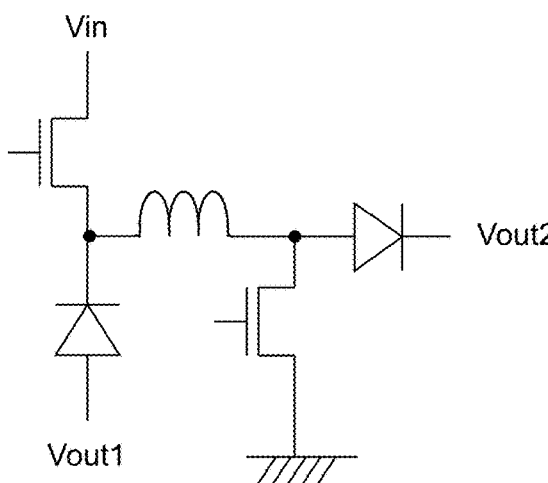
Figure 3K:
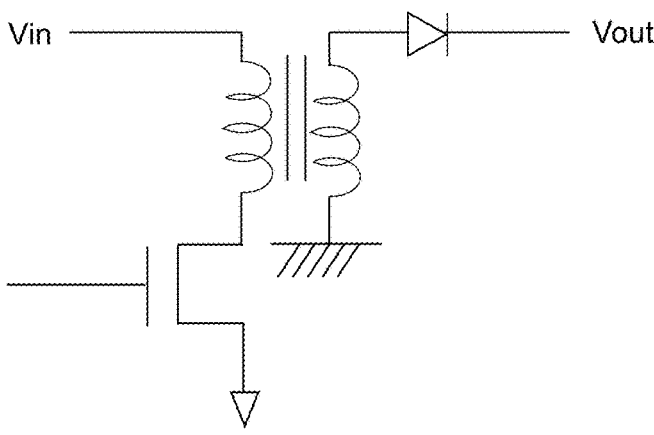

FIG. 2D shows a schematic diagram of the comparison circuit and the decision circuit within the control circuit of the switching regulator according to an embodiment of the invention. This embodiment represents an exemplary embodiment of the comparison circuit 2021 and the decision circuit 2022 shown in FIG. 2B. As illustrated in FIG. 2D, the comparison circuit 2021 can be a comparator, for instance, configured to compare the phase node voltage Vlx with the predetermined threshold voltage Vlx_ref. The decision circuit 2022 includes for example a pulse generator PG, a flip-flop FF, and an inverter INV.

FIG. 2E shows a schematic diagram of the capacitance adjustment procedure circuit in the control circuit of the switching regulator according to an embodiment of the invention. As shown in FIG. 2E, the capacitance adjustment procedure circuit 2023 includes a counting circuit 20231, which counts the pulses of the pulse width modulation signal NGATEi based on the enable and hold signal Lx_lolb to generate the procedure signal QCOUNT<3:0>. The capacitance adjustment procedure circuit 20231 further includes a logic circuit 20232 which is configured to, when the procedure signal QCOUNT<3:0> indicates that the pulse count of the pulse width modulation signal NGATEi has exceeded a predetermined number of pulses, generate an enable adjustment signal Sen to enable the equivalent capacitance adjustment circuit 2024, thereby generating the equivalent capacitance adjustment signal QGATE<3:0>.

FIG. 2G shows a block diagram of the counting circuit in the capacitance adjustment procedure circuit of the control circuit in the switching regulator according to an embodiment of the invention. As shown in FIG. 2G, in one embodiment, the counting circuit 20231 includes a unidirectional counter 202311 which is configured to count the pulses of the pulse width modulation signal NGATEi based on the enable and hold signal Lx_lolb. When the procedure signal QCOUNT<3:0> indicates that the pulse count of the pulse width modulation signal NGATEi has exceeded a predetermined number of pulses, the logic circuit 20232 generates an enable adjustment signal Sen. The unidirectional counter 202311 overflows and resets to cyclically count when the count reaches the indicated pulse count exceeding the predetermined number of pulses as signified by the procedure signal QCOUNT<3:0>.

FIG. 2F shows a schematic diagram of the equivalent capacitance adjustment circuit in the control circuit of the switching regulator according to an embodiment of the invention. As depicted in FIG. 2F, the equivalent capacitance adjustment circuit 2024 includes a counter 20241 which is configured to, upon the adjustment enable signal Sen switching to an enable state, cumulatively count and adjust the equivalent capacitance adjustment signal QGATE<3:0> by a predetermined unit to adjust the combination of the plural capacitors to be electrically connected to the phase node LX. FIG. 2H shows a block diagram of the counter in the equivalent capacitance adjustment circuit of the control circuit in the switching regulator according to an embodiment of the invention. As illustrated in FIG. 2H, in one embodiment, the counter 20241 includes a unidirectional counter 202411, which is configured to, upon the adjustment enable signal Sen being switched to an enable state, cumulatively count of the equivalent capacitance adjustment signal QGATE<3:0> in an unidirectional manner, so as to correspondingly adjust the combination of capacitors to be electrically connected to the phase node LX. The unidirectional counter 202411 overflows and resets to cyclically count when the unidirectional count reaches a predetermined counting limit.

FIGS. 3A to 3K show various embodiments of the switching regulator to which the present invention can be applied. The power stage circuit 201 in FIG. 2A can be configured as any of the power stage circuit topologies shown in FIGS. 3A to 3K, such as a buck power stage, a boost power stage, a buck-boost power stage, an inverting buck-boost power stage, and a flyback power stage.

Figure 4:
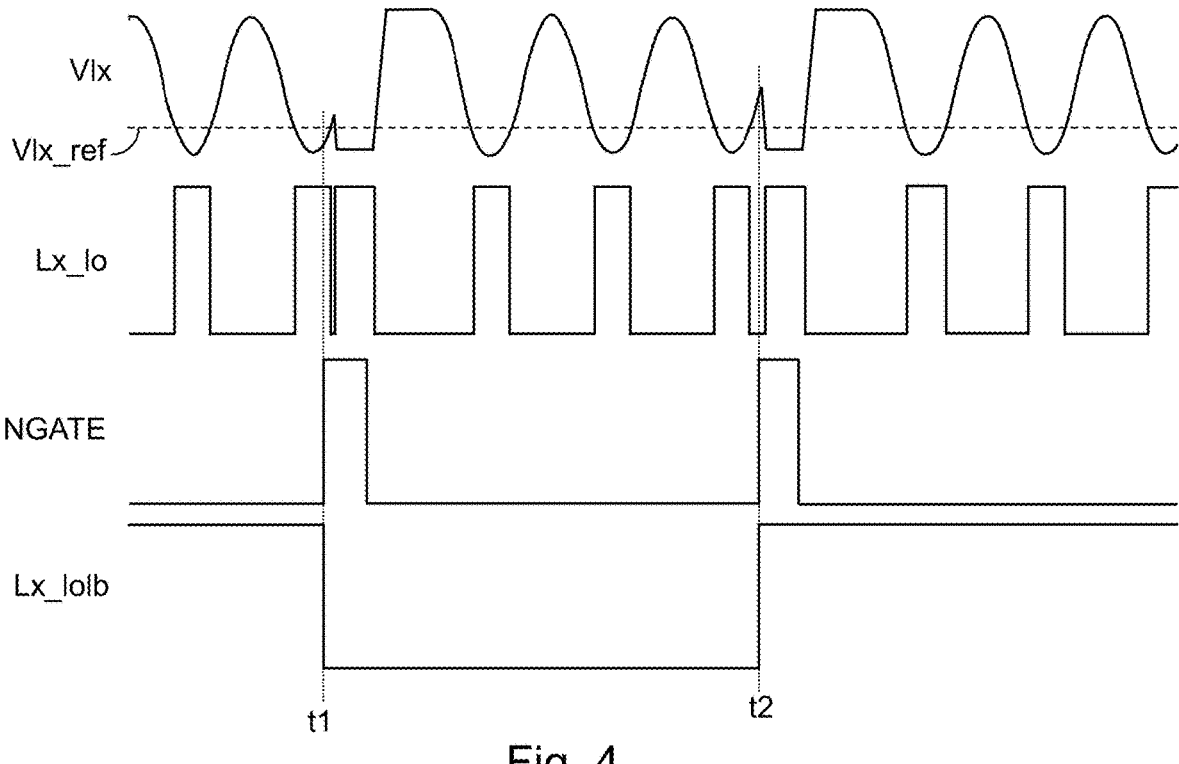
FIGS. 4 and 5 are signal waveform diagrams showing relevant signals of the switching regulator in FIG. 2A according to an embodiment of the invention.

FIG. 4 shows a signal waveform diagram of relevant signals of the switching regulator in FIG. 2A according to an embodiment of the invention. The phase node voltage Vlx, the predetermined threshold voltage Vlx_ref, the comparison signal Lx_lo, the pulse width modulation signal NGATE, and the enable and hold signal Lx_lolb are displayed in FIG. 4. Simultaneously referring to FIG. 4, FIG. 2D, and FIG. 2E, at time t1, when both the comparison signal Lx_lo and the pulse width modulation signal NGATE are at the enable level, indicating that the phase node voltage Vlx at the start of inductor magnetization is below the predetermined threshold voltage Vlx_ref, the enable and hold signal Lx_lolb is consequently switched to the disable level, causing the capacitance adjustment procedure circuit 2023 not to conduct the capacitance adjustment procedure.

It should be noted that after time t1, when the pulse width modulation signal NGATE is at the enable level, indicating that the power switch QL is conducting and the inductor L is in the magnetized state, the control circuit 202 does not conduct the capacitance adjustment procedure nor determine whether the equivalent capacitance adjustment procedure is in the enable state. At this time, the equivalent capacitance Ceq and the inductor L do not form a resonant circuit, nor does quasi-resonance occur; therefore, the phase node voltage Vlx on phase node LX is not a quasi-resonant signal, as illustrated in the waveform diagram of the phase node voltage Vlx in FIG. 4.

Continuing with FIG. 4, at time t2, when the comparison signal Lx_lo is at the disable level and the pulse width modulation signal NGATE is at the enable level, indicating that the phase node voltage Vlx exceeds, for example, the predetermined threshold voltage Vlx_ref at the start of inductor magnetization, the enable and hold signal Lx_lolb is thus switched to the enable level, causing the capacitance adjustment procedure circuit 2023 to conduct the capacitance adjustment procedure.

It should be noted that in this embodiment, conducting the capacitance adjustment procedure refers to the capacitance adjustment procedure circuit 2023 continuously accumulating the number of pulses of the pulse width modulation signal NGATE, and when the capacitance adjustment procedure circuit 2023 accumulates a number of pulses of the pulse width modulation signal NGATE exceeding the predetermined number of pulses, enabling the equivalent capacitance adjustment circuit 2024, thereby generating the equivalent capacitance adjustment signal QGATE<3:0> for the resonant regulator 203, to change the combination of the plural capacitors C1 to C4 being electrically connected to the phase node LX in the resonant regulator 203, thereby changing the equivalent capacitance Ceq at the phase node LX, reducing the phase node voltage Vlx at the next start of inductor magnetization after the equivalent capacitance adjustment procedure, and reducing the switching loss Ploss when the power switch QL conducts.

FIG. 5 shows a signal waveform diagram of relevant signals of the switching regulator in FIG. 2A according to an embodiment of the invention. The enable and hold signal Lx_lolb, the pulse width modulation signal NGATE, the procedure signal QCOUNT<3:0>, and the equivalent capacitance adjustment signal QGATE<3:0> are displayed in FIG. 5. Simultaneously referring to FIG. 5 and FIG. 2E, when Lx_lolb is at the enable level, the counting circuit 20231 begins counting the pulses of the pulse width modulation signal NGATEi. When the procedure signal QCOUNT<3:0> counts from 0 exceeding a predetermined number of pulses such as 15, the counter 20241 cumulatively counts, as shown in FIG. 5, the equivalent capacitance adjustment signal QGATE<3:0> accumulates from 5 to 6, thereby correspondingly adjusting the capacitance value of the capacitors electrically connected to LX to, for example, 6C.

It should be noted that the procedure signal QCOUNT<3:0> and the equivalent capacitance adjustment signal QGATE<3:0> are represented for example as binary digits. In this embodiment, the procedure signal QCOUNT<3:0> and the equivalent capacitance adjustment signal QGATE<3:0> are 4-bit binary digits. The procedure signal QCOUNT<3:0> represents the pulse count of the pulse width modulation signal NGATEi, and the accumulated count of the equivalent capacitance adjustment signal QGATE<3:0> represents the combination of the plural capacitors and the corresponding capacitance to be electrically connected to the phase node LX.

Figures 6, 7:
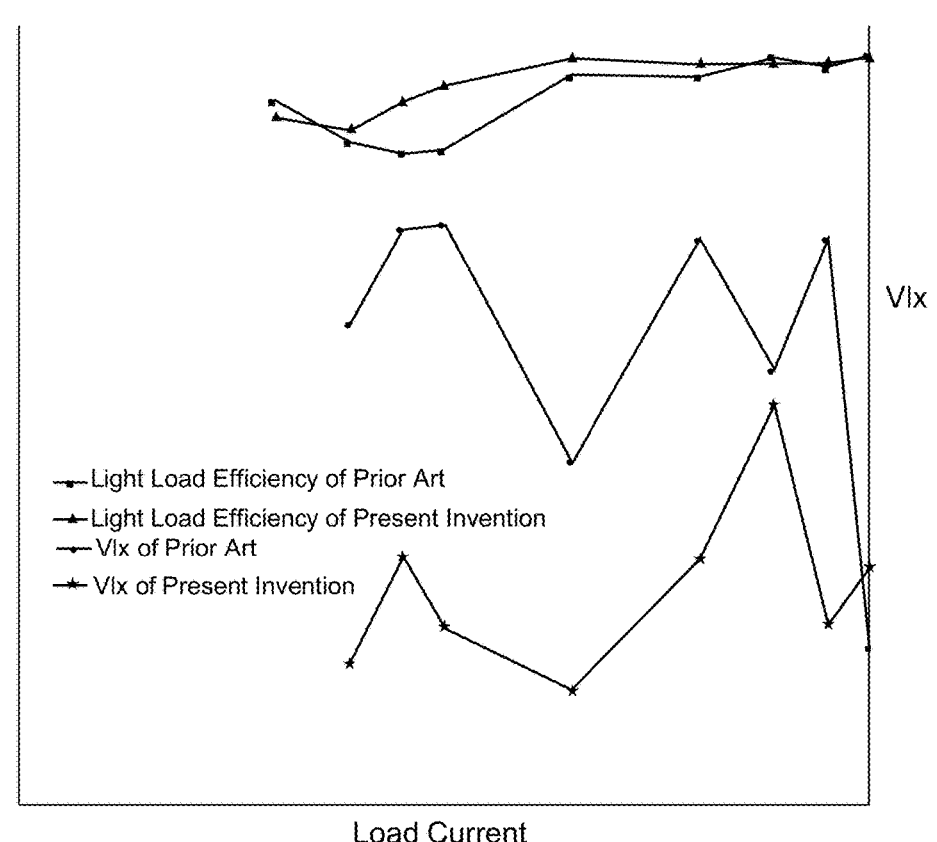

FIG. 6 shows a graph relating the light-load efficiency of the switching regulator of the invention to the phase node voltage at the turn-on of the low-side switch and the light-load efficiency of prior art switching regulators to the phase node voltage at the turn-on of the low-side switch according to an embodiment of the invention. FIG. 7 shows a list under different load currents of the light-load efficiency of the switching regulator of the invention and the phase node voltage at the turn-on of the low-side switch compared to the light-load efficiency and the phase node voltage at the turn-on of the low-side switch of prior art switching regulators. Referring to FIGS. 6 and 7, under the same load currents, the light-load efficiency of the invention is relatively higher compared to the prior art technologies, and the phase node voltage Vlx at the turn-on of the low-side switch of the invention is relatively lower compared to the prior art technologies.

In summary, the present invention can operate with a fixed frequency while achieving better light-load efficiency by determining whether the phase node voltage exceeds the predetermined threshold voltage and adjusting the equivalent capacitance when the phase node voltage exceeds the predetermined threshold voltage, thereby adjusting the resonant frequency during the quasi-resonant period to keep the phase node voltage below the predetermined threshold voltage.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a part of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator, comprising:
a power stage circuit configured to control a power switch based on a pulse width modulation signal, switching an inductor coupled at a phase node to convert an input voltage into an output voltage; and
a control circuit configured, in a discontinuous conduction mode (DCM), to determine an equivalent capacitance adjustment procedure to enter or sustain an enable state based on the voltage at the phase node at the start of inductor magnetization, thereby adjusting the equivalent capacitance at the phase node to reduce the voltage across the power switch at the start of the next inductor magnetization.

2. The switching regulator of claim 1, wherein the control circuit determines the equivalent capacitance adjustment procedure to enter or sustain the enable state when the voltage at the phase node exceeds a predetermined threshold voltage at the start of inductor magnetization.

3. The switching regulator of claim 2, wherein the control circuit includes:
a comparator circuit, configured to compare the voltage at the phase node with the predetermined threshold voltage to generate a comparison signal;
a determination circuit configured to generate an enable and hold signal, based on the comparison signal and the pulse width modulation signal, when the voltage at the phase node is determined exceeding the predetermined threshold voltage at the start of inductor magnetization;
a capacitance adjustment procedure circuit, configured to generate a procedure signal based on the enable and hold signal and the pulse width modulation signal; and
an equivalent capacitance adjustment circuit configured to generate an equivalent capacitance adjustment signal, based on the procedure signal, to adjust the equivalent capacitance on the phase node.

4. The switching regulator of claim 3, further comprising a resonant regulator coupled to the phase node and including a capacitor array with plural capacitors, wherein the resonant regulator determines a combination of the plural capacitors to be electrically connected to the phase node based on the equivalent capacitance adjustment signal, so as to adjust the equivalent capacitance on the phase node.

5. The switching regulator of claim 4, wherein the plural capacitors in the capacitor array have a maximum total capacitance value and/or a capacitance resolution that is relate to the predetermined threshold voltage.

6. The switching regulator of claim 4, wherein the capacitance adjustment procedure circuit includes a first counting circuit configured to count the pulses of the pulse width modulation signal based on the enable and hold signal to generate the procedure signal which represents the pulse count.

7. The switching regulator of claim 6, wherein the capacitance adjustment procedure circuit further includes a logic circuit configured to generate an enable adjustment signal when the pulse count represented by the procedure signal exceeds the predetermined number of pulses indicated by the procedure signal, thereby enabling the equivalent capacitance adjustment circuit to generate the equivalent capacitance adjustment signal.

8. The switching regulator of claim 7, wherein the equivalent capacitance adjustment circuit includes a second counter, which cumulatively counts and adjusts the equivalent capacitance adjustment signal by a predetermined unit when the adjustment enable signal is switched to an enable state, so as to adjust the combination of the plural capacitors to be electrically connected to the phase node.

9. The switching regulator of claim 8, wherein the second counter includes a second unidirectional counter that, when the adjustment enable signal is in an enable state, cumulatively counts the equivalent capacitance adjustment signal in a unidirectional manner to correspondingly adjust the combination of the plural capacitors to be electrically connected to the phase node.

10. The switching regulator of claim 9, wherein when the second unidirectional counter cumulatively counts to a predetermined counting limit in a unidirectional manner, the second unidirectional counter overflows and resets to count cyclically.

11. The switching regulator of claim 7, wherein the first counting circuit includes a first unidirectional counter configured to count the pulses of the pulse width modulation signal based on the enable and hold signal in a unidirectional manner, wherein the logic circuit generates the enable adjustment signal when the pulse count indicated by the procedure signal exceeds the predetermined number of pulses.

12. The switching regulator of claim 11, wherein when the pulse count indicated by the procedure signal exceeds the predetermined number of pulses, the first unidirectional counter overflows and resets to count cyclically.

13. The switching regulator of claim 2, wherein the control circuit adjusts the equivalent capacitance at the phase node so that at the start of inductor magnetization in a steady state, the phase node voltage does not exceed the predetermined threshold voltage.

14. The switching regulator of claim 1, wherein the control circuit adjusts the equivalent capacitance after the equivalent capacitance adjustment procedure has been enabled and sustained for a predetermined duration.

15. The switching regulator of claim 14, wherein the control circuit, while the capacitance adjustment procedure is in the enable state, counts the pulses of the pulse width modulation signal to accumulate a pulse count and indicates that the capacitance adjustment procedure has been sustained for the predetermined duration once the pulse count exceeds a predetermined number of pulses.

16. The switching regulator of claim 14, wherein the predetermined duration is related to a control loop bandwidth of the switching regulator and/or a stability level of the equivalent capacitance adjustment procedure.

17. A control method for controlling a switching regulator which includes a power stage circuit that controls a power switch based on a pulse width modulation signal and switches an inductor coupled to a phase node to convert an input voltage to an output voltage, the control method comprising:
determining an equivalent capacitance adjustment procedure to enter or sustain an enable state based on the voltage at the phase node at the start of inductor magnetization in a discontinuous conduction mode (DCM); and
adjusting the equivalent capacitance at the phase node according to the equivalent capacitance adjustment procedure to reduce the voltage across the power switch at the start of the next inductor magnetization.

18. The control method of claim 17, wherein the step of determining the equivalent capacitance adjustment procedure to enter or sustain the enable state in a discontinuous conduction mode (DCM) based on the phase node voltage at the start of inductor magnetization includes:

deciding the equivalent capacitance adjustment procedure to enter or sustain the enable state when the phase node voltage exceeds a predetermined threshold voltage at the start of inductor magnetization.

19. The control method of claim 18, wherein the step of determining an equivalent capacitance adjustment procedure in an enable state during a discontinuous conduction mode (DCM) based on the voltage at the phase node at the start of inductor magnetization includes:

comparing the voltage at the phase node with the predetermined threshold voltage to generate a comparison signal;

generating an enable and hold signal based on the comparison signal and the pulse width modulation signal when the voltage at the phase node exceeds the predetermined threshold voltage at the start of inductor magnetization;

conducting the equivalent capacitance adjustment procedure based on the enable and hold signal and the pulse width modulation signal to generate a procedure signal; and generating an equivalent capacitance adjustment signal based on the procedure signal.

20. The control method of claim 19, further comprising:

during the equivalent capacitance adjustment procedure, determining the combination of the plural capacitors to be electrically connected to the phase node based on the equivalent capacitance adjustment signal, thereby adjusting the equivalent capacitance at the phase node.

21. The control method of claim 20, wherein the maximum total capacitance value and/or capacitance resolution of the plural capacitors are related to the predetermined threshold voltage.

22. The control method of claim 19, wherein the step of generating the equivalent capacitance adjustment signal based on the procedure signal includes:

cumulatively counting the equivalent capacitance adjustment signal in a unidirectional manner to correspondingly adjust the combination of the plural capacitors to be electrically connected to the phase node; and overflowing and resetting to count cyclically when a count represented by the equivalent capacitance adjustment signal reaches a predetermined counting limit.

23. The control method of claim 18, wherein the step of reducing the voltage across the power switch at the start of the next inductor magnetization includes:

adjusting the equivalent capacitance at the phase node so that at the start of inductor magnetization in a steady state, the phase node voltage does not exceed the predetermined threshold voltage.

24. The control method of claim 17, wherein the step of adjusting the equivalent capacitance at the phase node to reduce the voltage across the power switch at the start of the next inductor magnetization includes:

adjusting the equivalent capacitance after the equivalent capacitance adjustment procedure entering or sustaining the enable state and sustaining for a predetermined duration.

25. The control method of claim 24, wherein during the equivalent capacitance adjustment procedure in the enable state, counting the pulses of the pulse width modulation signal for accumulating a pulse count; and indicating that the equivalent capacitance adjustment procedure has been sustained for the predetermined duration once the pulse count exceeds a predetermined number of pulses.

26. The control method of claim 25, wherein the step of indicating that the equivalent capacitance adjustment procedure has been sustained for the predetermined duration includes:

counting the pulses of the pulse width modulation signal in a unidirectional manner; and overflowing and resetting to count cyclically when the pulse count exceeds a predetermined number of pulses.

27. The control method of claim 24, wherein the predetermined duration is related to a control loop bandwidth of the switching regulator and/or a stability level of the equivalent capacitance adjustment procedure.

* * * * *